United States Patent
Blodgett (10) Patent No.: US 11,606,949 B2
(45) Date of Patent: Mar. 21, 2023

(54) TURKEY CALL

(71) Applicant: Keystone Calls, LLC, Painted Post, NY (US)

(72) Inventor: Daniel J. Blodgett, Corning, NY (US)

(73) Assignee: Keystone Calls, LLC, Painted Post, NY (US)

( * ) Notice: Subject to any disclaimer, the term of this patent is extended or adjusted under 35 U.S.C. 154(b) by 0 days.

(21) Appl. No.: 17/159,042

(22) Filed: Jan. 26, 2021

(65) Prior Publication Data

US 2021/0251214 A1 Aug. 19, 2021

Related U.S. Application Data

(60) Provisional application No. 62/976,068, filed on Feb. 13, 2020.

(51) Int. Cl.
*A01M 31/00* (2006.01)

(52) U.S. Cl.
CPC ................................ *A01M 31/004* (2013.01)

(58) Field of Classification Search
CPC ............................. A01M 31/04; A01M 31/004
USPC .................................................. 446/397, 418
See application file for complete search history.

(56) References Cited

U.S. PATENT DOCUMENTS

| | | | | |
|---|---|---|---|---|
| 2,643,483 A * | 6/1953 | Walker | ................ | A01M 31/004 43/2 |
| 3,208,184 A * | 9/1965 | Wisor | ...................... | A63H 5/00 446/397 |
| 4,041,639 A * | 8/1977 | Funk | .................... | A01M 31/004 446/397 |
| 4,310,986 A * | 1/1982 | Jacobs | ..................... | G10K 1/00 446/397 |
| 4,606,733 A * | 8/1986 | Willis | ................. | A01M 31/004 446/419 |
| 4,662,858 A * | 5/1987 | Hall | ..................... | A01M 31/004 446/397 |
| 4,955,845 A * | 9/1990 | Piper | .................... | A01M 31/004 446/397 |
| 5,503,585 A * | 4/1996 | Heineman | ........... | A01M 31/004 43/2 |
| 5,846,119 A * | 12/1998 | Long | .................... | A01M 31/004 446/397 |
| 6,599,168 B1 * | 7/2003 | Weaver | ............... | A01M 31/004 446/397 |
| 6,872,118 B1 * | 3/2005 | Bishop | ................ | A01M 31/004 84/404 |
| 8,235,763 B1 * | 8/2012 | Burcham | ............ | A01M 31/004 84/404 |
| 8,517,792 B1 * | 8/2013 | Foster | ................. | A01M 31/004 446/418 |
| 10,897,888 B1 * | 1/2021 | Walker | ............... | A01M 31/004 |

(Continued)

*Primary Examiner* — Joseph B Baldori
(74) *Attorney, Agent, or Firm* — Greenberg Traurig LLP (57) ABSTRACT

A turkey call includes a top housing having a first magnet overlying an inner surface of the top housing and aligned with a rotation axis and a strike shaft affixed to the top housing and radially offset from the rotation axis, and a bottom housing having a second magnet overlying an inner surface of the bottom housing and aligned with the rotation axis and a call element affixed to the inner surface of the bottom housing opposing the strike shaft, where the top housing is magnetically coupled to the bottom housing.

19 Claims, 5 Drawing Sheets

(56) References Cited

U.S. PATENT DOCUMENTS

| | | | |
|---|---|---|---|
| 2008/0057823 A1* | 3/2008 | Simone | F41C 27/00 446/213 |
| 2010/0075571 A1* | 3/2010 | Shafer | A01M 31/004 446/404 |
| 2016/0309700 A1* | 10/2016 | Thomas | A01M 31/004 |
| 2021/0368778 A1* | 12/2021 | Mirocha | G10K 3/00 |

* cited by examiner

TURKEY CALL

CROSS-REFERENCE TO RELATED APPLICATION

This application claims the benefit of priority under 35 U.S.C. § 119(e) of U.S. Provisional Application No. 62/976,068, filed Feb. 13, 2020, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the appended claims.

DETAILED DESCRIPTION OF EXEMPLARY EMBODIMENTS

The present disclosure relates generally to a turkey call for use by hunters to attract wild turkeys, and more particularly to a friction call having opposing housing elements that are held together using magnetic force and which respectively include components that when brought into dynamic contact can produce a sound that imitates the vocalization of turkeys.

Various types of turkey calls are marketed to enable hunters or competition callers to attract wild turkeys, each having advantages and disadvantages, including ease of use, versatility, sensitivity to moisture, etc. Example turkey calls include push button calls, box calls, diaphragm calls, and pot and striker calls. Notwithstanding recent developments, it would be advantageous to provide a turkey call that is mechanically robust, simple to use, and capable of producing a wide range of relevant sounds for calling over long distances.

In accordance with various embodiments, a turkey call may include a pair of mating housings arranged in an opposing and mutually rotatable orientation about a common rotation axis. Each housing may include a permanent magnet aligned with the rotation axis and configured to magnetically interact with (i.e., attract) the magnet of the opposing housing. The magnets may be bonded within each respective housing using a suitable adhesive such that the mating housings may rotate with respect to each other while being held in the opposing orientation via mutual attraction between the magnets. Example magnets may include neodymium iron boron (NdFeB), samarium cobalt (SmCo), alnico, and ceramic or ferrite magnets, although the choice of magnets is not particularly limited.

As used herein, the respective housings may be designated as a "top" housing and a "bottom" housing, although such a designation may be considered arbitrary and is used only for the sake of convenience. That is, an assembled turkey call may be oriented such that the top housing is facing up and the bottom housing is facing down, or vice versa.

In certain embodiments, the magnets and the top and bottom housings may include a circular or substantially circular cross section. The shape of the magnets may be characterized as a circular prism, where the diameter and the thickness of each magnet may independently range from approximately 0.15 times to approximately 0.5 times the diameter and the height of the corresponding housing, e.g., approximately 0.15, approximately 0.2, approximately 0.25, approximately 0.3, approximately 0.35, approximately 0.4, approximately 0.45, or approximately 0.5 times, including ranges between any of the foregoing values.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

In accordance with various embodiments, the top housing may include an integral strike shaft and the bottom housing may include a call element where during operation of the turkey call, rotation of the top housing with respect to the bottom housing causes a distal end portion of the strike shaft to move along a circular or substantially circular path across a surface of the call element. The frictional interaction between the strike shaft and the surface of the call element may produce a variety of sounds. Moreover, the sound character (i.e., pitch, frequency, volume, etc.) can be varied by changing one or more of the relative rates of rotation of the housings, the frequency of rotation, the amount of applied pressure, and the like, as well as one or more characteristics of the strike shaft and the call element, including their respective geometry, composition, etc. A strike shaft may include a hardwood material, for example, and the call element may include natural slate. With respect to a major surface of the call element, in certain embodiments, the strike shaft may be inclined at an angle relative to normal of up to approximately 20°, e.g., approximately 2°, 4°, 6°, 8°, 10°, 12°, 14°, 16°, 18° or 20°, including ranges between any of the foregoing values.

A variety of methods and materials may be used to form the top and bottom housings. Example methods may include subtractive methods such as turning, milling, grinding, sanding, etc. Example materials may include various hardwoods such as mahogany, black walnut, oak, or cherry. In certain embodiments, the top housing and the bottom housing may be formed from the same wooden material. In alternate embodiments, the top housing and the bottom housing may be formed from different wooden materials. For instance, the top housing and the bottom housing may each be formed from mahogany, or the top housing may be formed from mahogany and the bottom housing may be formed from cherry. In particular embodiments, the top and bottom housings may be formed from fine-grained mahogany using a CNC router.

In certain embodiments, the bottom housing may be formed as a unitary part, for example, by milling or using a lathe. In further aspects, the bottom housing may be assembled from two or more components, such as an annular portion and a cap fitted over one axial end of the annular portion. That is, an annular portion and a cap may be formed separately and joined, e.g., using a suitable adhesive.

In certain embodiments, the bottom housing may be configured to fixedly receive a call element, such as a planar slate member. The call element may engage a lower circumferential ledge formed along an inner surface of the bottom housing such that a surface of the call element may be spaced away from a bottom surface of the bottom housing to define a sound chamber within the bottom housing. Proximate to the sound chamber, one or more openings may be formed in the bottom surface of the bottom housing to allow sound to emanate from the turkey call. An adhesive may be used to secure the call element within the bottom housing.

Although various embodiments are described herein with reference to a call element that includes slate, other materials for the call element are contemplated, including ceramic and glass compositions, metals such as aluminum (e.g., anodized aluminum), as well as multilayers thereof. For instance, a call element may include a ceramic friction surface and an underlying glass sound board.

The top housing may include a strike shaft mounted to the top housing that extends below a bottom surface thereof. As will be appreciated, the strike shaft may be radially offset from the rotation axis by a predetermined distance. The strike shaft may include a natural hardwood (e.g., mahogany, black walnut, oak, or cherry), carbon fiber, or a synthetic acrylic material, for example. In some embodiments, the strike shaft and the top housing may be formed using the same material. In some embodiments, the strike shaft and the top housing may be formed using different materials. The strike shaft and the top housing may be formed as separate components, joined, and bonded using a suitable adhesive. By way of example, the strike shaft may be integrated with the top housing through an aperture formed in a top surface of the top housing.

The top housing and the bottom housing may be aligned substantially along the common rotation axis and brought into contact along respective peripheral edges. In certain embodiments, the bottom housing may further include an upper circumferential ledge located above the lower circumferential ledge upon which a peripheral portion of the top housing may engage during operation. In an assembled turkey call, the magnets may be commonly-aligned along the rotation axis and may be spaced apart from one another or in direct contact. That is, an attractive force between the magnets may be used to hold the top and bottom housings in an opposing, assembled relationship where the magnets are separated by an air gap or abut one another. In turn, the housings may be rotated with respect to one another about the common rotation axis, for example, in one continuous motion, or in a series of successive motions, to cause the strike shaft to move over a surface of the call element while contacting the surface to produce friction-derived sounds. The presently-disclosed turkey call may be used to produce a variety of different and authentic turkey sounds, including clucks, yelps, cackles, purrs, gobbles, and kee-kee sounds.

According to various embodiments, a turkey call includes a top housing having a first magnet bonded to an inner surface of the top housing and a strike shaft affixed to the top housing, wherein the first magnet is aligned with a rotation axis of the top housing and the strike shaft is radially offset from the rotation axis, and a bottom housing having a call element bonded to the bottom housing and a second magnet affixed to a surface of the call element and aligned with the rotation axis, where the first housing and the second housing are magnetically coupled such that a distal end of the strike shaft contacts a surface of the call element. In an example method, a user may rotate the top housing with respect to the bottom housing to cause an engaged motion of the strike shaft with the call element and an associated production of sound. In particular embodiments, the turkey call may produce sound when a user holds the top housing and the bottom housing and twists the top housing with respect to the bottom housing, i.e., without the user directly contacting either the strike shaft or the call element.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 1:
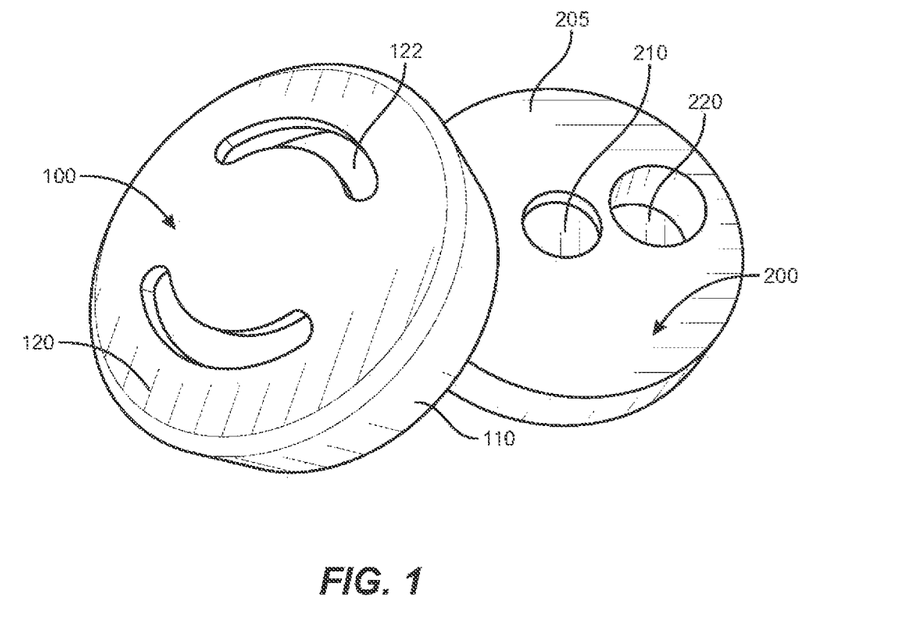
FIG. 1 is a perspective view of the housing elements of an exemplary turkey call according to certain embodiments.

The following will provide, with reference to FIGS. 1-8, detailed descriptions of a magnetically-engaged, hand-held turkey call and its various components. Referring to FIG. 1, shown in perspective are the bottom and top housings of an exemplary call. Bottom housing 100 and top housing 200 may each be formed from a hardwood material. Bottom housing 100 may include an annular portion 110 and a cap 120 secured to the annular portion. Cap 120 may include one or more openings 122 through which sounds produced by the turkey call may emanate.

Top housing 200 may include one or more recesses that extend into an inner surface 205 thereof. A magnet recess 210 may be located within a central portion of the top housing, and a strike shaft recess 220 may be radially offset from the magnet recess 210. In the illustrated embodiment, the bottom surface 205 may be substantially planar and a depth of the magnet recess 210 may be less than a depth of the strike shaft recess 220.

Figure 2:
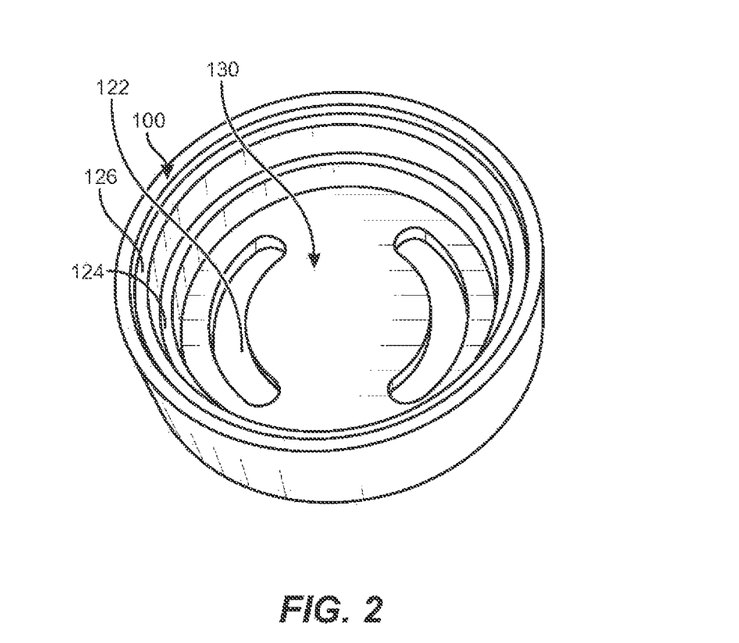
FIG. 2 is a detailed view of the interior of the bottom housing element of FIG. 1 according to various embodiments.

Referring to FIG. 2, shown is a perspective view of the interior of bottom housing 100. One or more circumferential ledges may be integral to the construction of the bottom housing. A lower and inner circumferential ledge 124 may be disposed along an inner surface of the bottom housing 100. The lower circumferential ledge 124 may provide a support surface for a call element (not shown). The call element may include a substantially planar disc that, when positioned on the lower circumferential ledge 124, may define a sound chamber 130 between an adjacent inner surface of the bottom housing 100 and the call element.

Referring still to FIG. 2, the bottom housing 100 may further include an upper and outer circumferential ledge 126 located above the lower circumferential ledge 124 upon which a peripheral portion of the top housing may engage in an assembled call.

Figure 3:
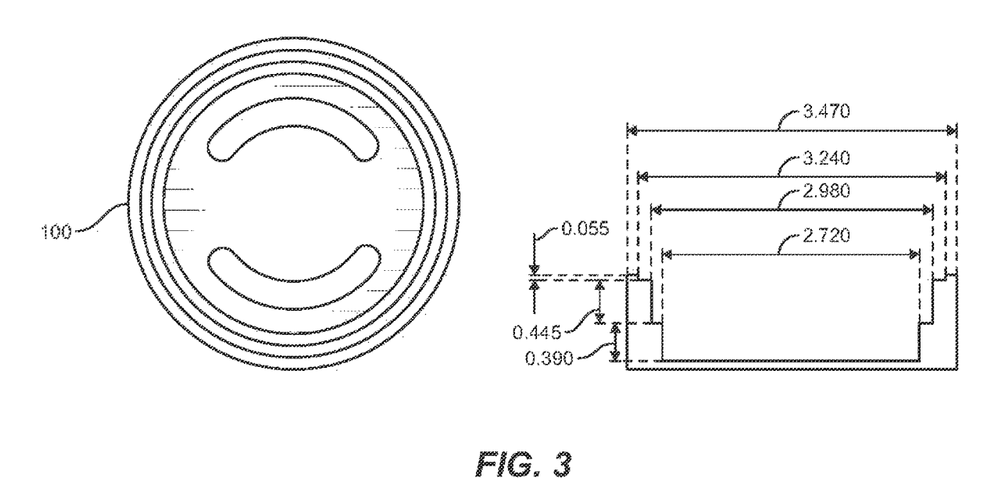
FIG. 3 is an engineering drawing providing example dimensions of the bottom housing element of a turkey call according to some embodiments.
Figure 4:
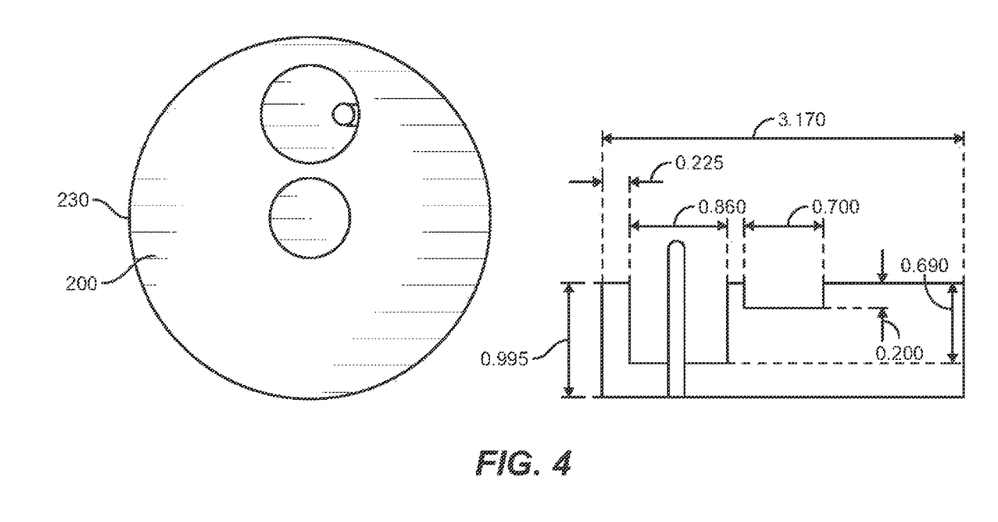
FIG. 4 is an engineering drawing providing example dimensions of the top housing element of a turkey call according to some embodiments.

FIG. 3 and FIG. 4 are engineering drawings showing top-down interior plan views and cross-sectional views for the bottom housing 100 and the top housing 200, respectively. In the illustrated embodiment, all dimensions are expressed in inches. As will be appreciated, the external diameter of top housing 200 (3.17 in) may be less than the internal diameter of the bottom housing 100 at upper circumferential ledge 126 (3.24 in) such that, in an assembled state, a peripheral portion 230 of the top housing 200 may directly overlie the upper circumferential ledge 126 of bottom housing 100.

Figure 5:
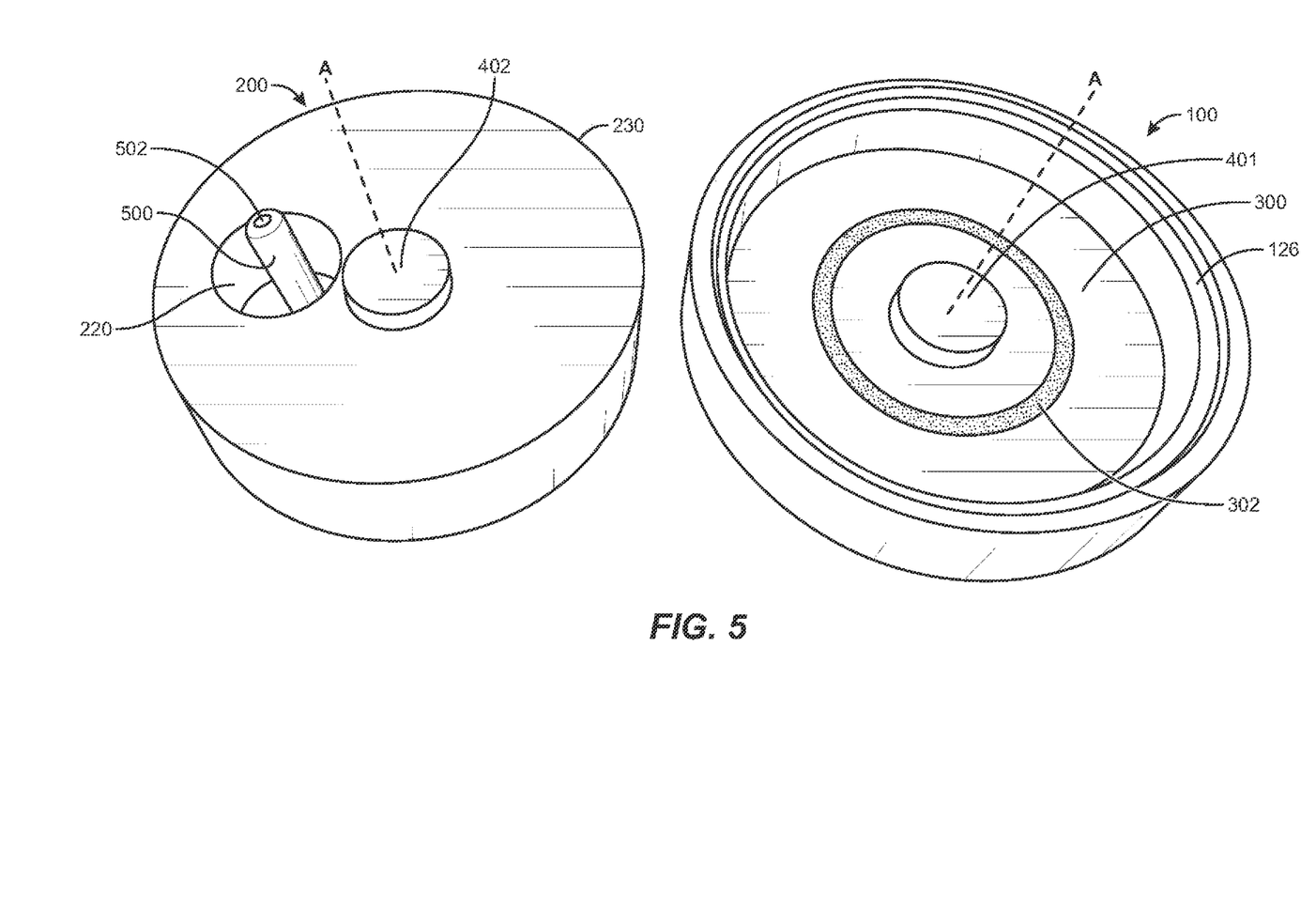
FIG. 5 is a perspective view showing the interior of the housing elements of a partially-assembled turkey call according to certain embodiments.

Perspective views of interior portions of the top and bottom housings of an exemplary turkey call in a partially-assembled state are shown in FIG. 5. Referring first to bottom housing 100, a cylindrical and substantially planar call element 300 may be disposed over lower circumferential ledge 124 and may be secured within bottom housing 100, e.g., along its periphery, using an adhesive such as an epoxy adhesive. A permanent magnet 401 is radially aligned with rotation axis A and bonded to a central, top surface of the call element 300.

Figure 6:
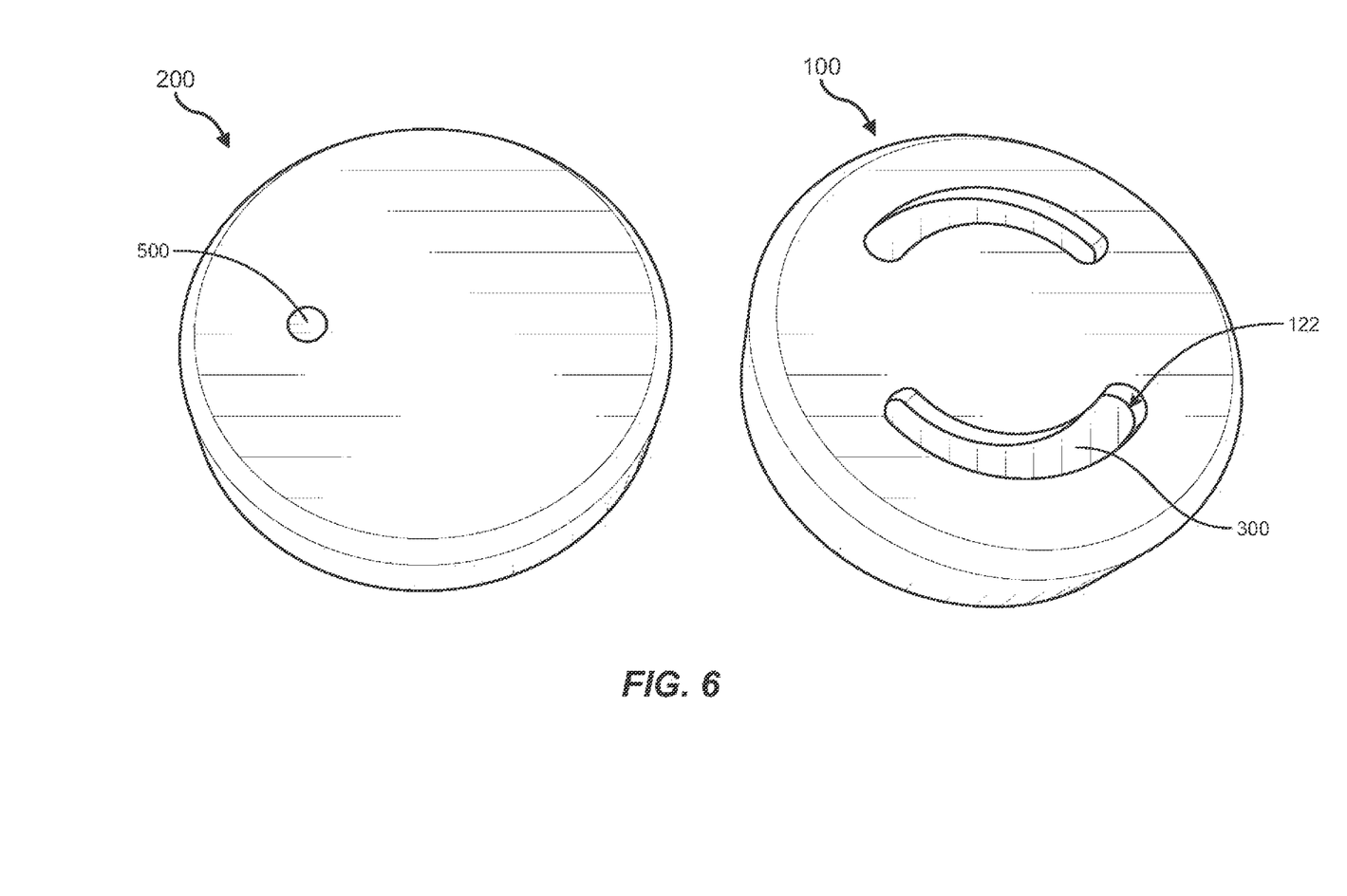
FIG. 6 is a perspective view showing the exterior of the housing elements of a partially-assembled turkey call according to some embodiments.

Referring now to top housing 200, a second magnet 402 may be inlaid within magnet recess 210 and bonded to the top housing 200 such that the second magnet 402 is radially aligned with rotation axis A. A strike shaft 500 may be located within shaft recess 220 and attached to top housing 200. Perspective views of exterior portions of the top and bottom housings of the exemplary turkey call of FIG. 5 are shown in FIG. 6. The inlaid strike shaft 500 is visible within the exterior surface of top housing 200. Call element 300 can be seen within bottom housing 100 via openings 122.

Figure 7:
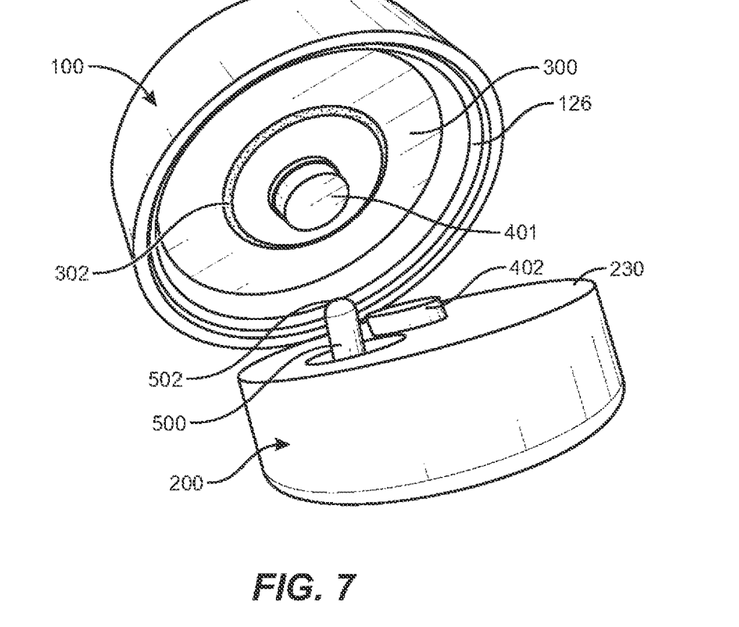
FIG. 7 is a perspective view of a turkey call in a partially-assembled state according to some embodiments.
Figure 8:
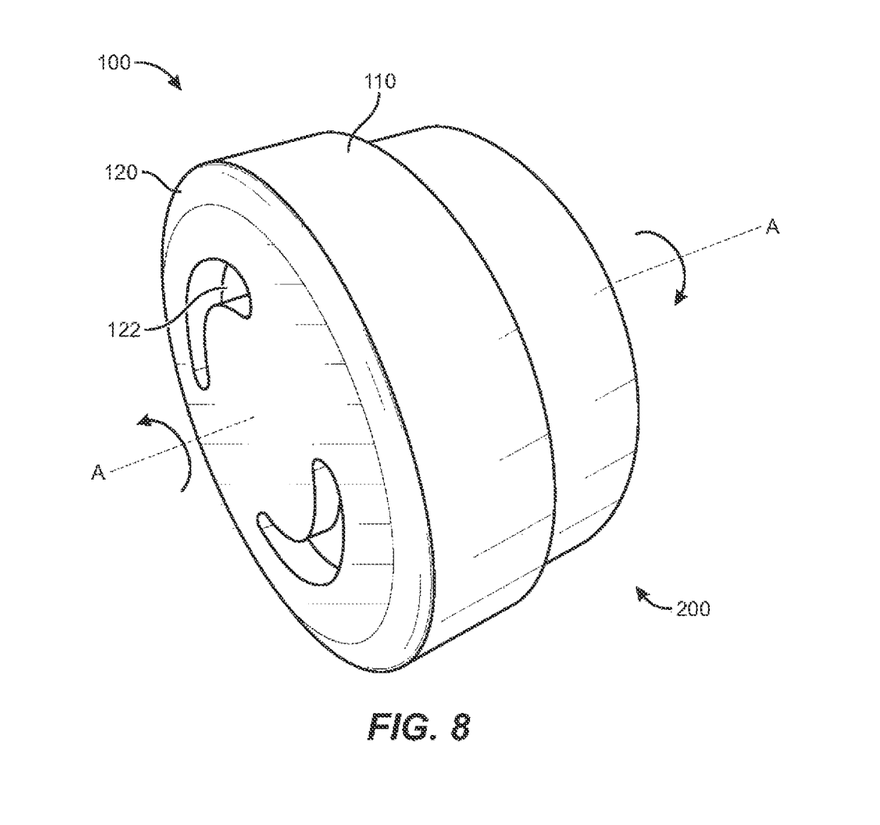
FIG. 8 is a perspective view of an assembled turkey call according to various embodiments.

Referring to FIG. 7, shown is a further perspective view of a turkey call in a partially-assembled state. Following use of the call, a wear track 302 corresponding to a circular path of the strike shaft 500 can be seen in the exposed surface of call element 300. A fully-assembled turkey call is shown in FIG. 8.

A method of operating a turkey call may include magnetically coupling a top housing to a bottom housing, the bottom housing including a call element and the top housing including a strike shaft, and rotating the top housing with respect to the bottom housing to move a distal end of the strike shaft over and in contact with a surface of the call element to produce sound.

According to certain embodiments, the call element 300 and/or the strike shaft 500, i.e., distal end 502 of strike shaft 500, may be re-conditioned from time-to-time using a suitable abrasive. Example reconditioning materials may include scouring pads, emery cloth, sandpaper, or conditioning stones. Such reconditioning materials may be used to roughen contact surfaces and/or remove grease, dirt, and oil.

Example 1: A turkey call assembly includes a top housing having a first magnet overlying an inner surface of the top housing and aligned with a rotation axis, and a strike shaft affixed to the top housing and radially offset from the rotation axis, and a bottom housing having a second magnet overlying an inner surface of the bottom housing and aligned with the rotation axis, and a call element affixed to the inner surface of the bottom housing opposing the strike shaft, wherein the top housing is magnetically coupled to the bottom housing.

Example 2: The turkey call assembly of Example 1, where the top housing is roto-dynamically coupled to the bottom housing about the rotation axis.

Example 3: The turkey call assembly of any of Examples 1 and 2, where the first magnet is bonded to the inner surface of the top housing and the second magnet is bonded to the call element.

Example 4: The turkey call assembly of any of Examples 1-3, where the first magnet and the second magnet are magnetically attracted to each other.

Example 5: The turkey call assembly of any of Examples 1-4, where the first magnet contacts the second magnet.

Example 6: The turkey call assembly of any of Examples 1-4, where the first magnet is separated from the second magnet by a gap.

Example 7: The turkey call assembly of any of Examples 1-6, where the strike shaft includes a rod having a substantially constant diameter and a tapered distal end.

Example 8: The turkey call assembly of any of Examples 1-7, where the strike shaft includes a hardwood.

Example 9: The turkey call assembly of any of Examples 1-8, where the top housing includes a strike shaft recess and a portion of the strike shaft is disposed within the strike shaft recess.

Example 10: The turkey call assembly of any of Examples 1-9, where a length of the strike shaft is greater than a distance between the inner surface of the top housing and the inner surface of the bottom housing.

Example 11: The turkey call assembly of any of Examples 1-10, where the call element includes a material selected from slate, glass, and ceramic.

Example 12: The turkey call assembly of any of Examples 1-11, where a distal end of the strike shaft contacts a surface of the call element.

Example 13: The turkey call assembly of any of Examples 1-12, where a distal end of the strike shaft is configured to contact a surface of the call element along a substantially circular path.

Example 14: The turkey call assembly of any of Examples 1-13, where an external diameter of the top housing is less than an internal diameter of the bottom housing.

Example 15: The turkey call assembly of any of Examples 1-14, where the bottom housing includes a circumferential ledge and a peripheral portion of the top housing rotatably abuts the circumferential ledge of the bottom housing.

Example 16: A turkey call includes a top housing having a first magnet and a strike shaft, and a bottom housing having a second magnet and a call element, the top housing being roto-dynamically coupled to the bottom housing by magnetic attraction between the first magnet and the second magnet, where the strike shaft is configured to contact a surface of the call element and produce sound during relative rotational movement of the top housing and the bottom housing.

Example 17: The turkey call of Example 16, where the first magnet is bonded to the top housing and the second magnet is bonded to the call element.

Example 18: The turkey call assembly of any of Examples 16 and 17, where the strike shaft is laterally displaced from the first magnet and is affixed to the top housing.

Example 19: A method includes magnetically coupling a top housing to a bottom housing, the top housing including a strike shaft and the bottom housing including a call element, and rotating the top housing with respect to the bottom housing to move a distal end of the strike shaft over and in contact with a surface of the call element to produce sound.

Example 20: The method of Example 19, where the sound imitates the vocalization of a turkey.

Example 21: A turkey call includes a top housing having a first magnet bonded to an inner surface of the top housing and a strike shaft affixed to the top housing, where the first magnet is aligned with a rotation axis of the top housing and the strike shaft is radially offset from the rotation axis, and a bottom housing having a call element bonded to the bottom housing and a second magnet affixed to a surface of the call element and aligned with the rotation axis, where the first housing and the second housing are magnetically coupled such that a distal end of the strike shaft contacts a surface of the call element.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a turkey call housing that comprises or includes mahogany include embodiments where a turkey call housing consists of mahogany and embodiments where a turkey call housing consists essentially of mahogany.

What is claimed is:

1. A turkey call assembly comprising:
a top housing including a first magnet overlying an inner surface of the top housing and aligned with a rotation axis, and a strike shaft affixed to the top housing and radially offset from the rotation axis, wherein the strike shaft is located within a strike shaft recess formed in and extending partially through the top housing and is radially spaced away from an inner wall of the strike shaft recess and an inner wall of the top housing; and
a bottom housing including a second magnet overlying an inner surface of the bottom housing and aligned with the rotation axis, and a call element affixed to the inner surface of the bottom housing opposing the strike shaft, wherein the top housing is magnetically coupled to the bottom housing.

2. The turkey call assembly of claim 1, wherein the top housing is roto-dynamically coupled to the bottom housing about the rotation axis.

3. The turkey call assembly of claim 1, wherein the first magnet is bonded to the inner surface of the top housing within a magnet recess formed in the inner surface of the top housing, and the second magnet is bonded to the call element.

4. The turkey call assembly of claim 1, wherein the first magnet and the second magnet are magnetically attracted to each other.

5. The turkey call assembly of claim 1, wherein the first magnet contacts the second magnet.

6. The turkey call assembly of claim 1, wherein the first magnet is separated from the second magnet by a gap.

7. The turkey call assembly of claim 1, wherein the strike shaft comprises a rod having a substantially constant diameter and a tapered distal end.

8. The turkey call assembly of claim 1, wherein the strike shaft comprises a hardwood.

9. The turkey call assembly of claim 1, wherein the call element comprises a material selected from the group consisting of slate, glass, and ceramic.

10. The turkey call assembly of claim 1, wherein a distal end of the strike shaft contacts a surface of the call element.

11. The turkey call assembly of claim 1, wherein a distal end of the strike shaft is configured to contact a surface of the call element along a substantially circular path.

12. The turkey call assembly of claim 1, wherein an external diameter of the top housing is less than an internal diameter of the bottom housing.

13. The turkey call assembly of claim 1, wherein the bottom housing comprises a circumferential ledge and a peripheral portion of the top housing rotatably abuts the circumferential ledge of the bottom housing.

14. The turkey call assembly of claim 1, wherein a surface of the call element is spaced away from the inner surface of the bottom housing to define a sound chamber within the bottom housing.

15. A turkey call comprising:
a top housing comprising a first magnet and a strike shaft; and
a bottom housing comprising a second magnet and a call element, the top housing being roto-dynamically coupled to the bottom housing by magnetic attraction between the first magnet and the second magnet, wherein the strike shaft is located within a strike shaft recess formed in and extending partially through the top housing and is radially spaced away from an inner wall of the strike shaft recess and an inner wall of the top housing and is configured to contact a surface of the call element and produce sound during relative rotational movement of the top housing and the bottom housing.

16. The turkey call of claim 15, wherein the first magnet is bonded to the top housing and the second magnet is bonded to the call element.

17. The turkey call of claim 15, wherein the strike shaft is laterally displaced from the first magnet and is affixed to the top housing.

18. A method comprising:
    magnetically coupling a top housing to a bottom housing, the top housing comprising a strike shaft and the bottom housing comprising a call element, wherein the strike shaft is located within a strike shaft recess formed in and extending partially through the top housing and is radially spaced away from an inner wall of the strike shaft recess and an inner wall of the top housing; and
    rotating the top housing with respect to the bottom housing to move a distal end of the strike shaft over and in contact with a surface of the call element to produce sound.

19. The method of claim 18, wherein the sound imitates the vocalization of a turkey.

\* \* \* \* \*